May 25, 1937.  U. MEININGHAUS  2,081,150

DISK CONSTRUCTION FOR RADIAL FLOW MACHINES

Filed July 26, 1933   2 Sheets-Sheet 2

INVENTOR

Ulrich Meininghaus

Patented May 25, 1937

2,081,150

UNITED STATES PATENT OFFICE 2,081,150

DISK CONSTRUCTION FOR RADIAL FLOW MACHINES

Ulrich Meininghaus, Mulheim-Ruhr, Germany

Application July 26, 1933, Serial No. 682,178
In Germany September 10, 1932

16 Claims. (Cl. 253—89)

My invention relates to disks which are constructed of concentric ring bodies connected to each other by axially flexible intermediate webs in the radial direction and are capable of resisting considerable thrust, such as disks which are used to support radially impinged blades and packings in rotary machines like steam or gas turbines. My invention aims at giving the disks an increased strength.

In thrust resisting disks which are constructed of concentric ring bodies having a cross section which extends continuously along their whole circumference at substantially constant diameter and connected to each other by flexible intermediate webs in the radial direction, bending moments are exerted on the several ring bodies through axially directed occurring forces which are taken up by the ring bodies themselves. In this way an unusually satisfactory distribution of stress takes place and very large axial forces can be resisted with small wall thicknesses. There are however cases in which unusually large axial forces must be taken up or in which extremely thin walls are to be maintained with axial forces which themselves are considerable. Finally the requirement often arises that the axial length of the structure must be kept as low as possible whereby the ring bodies lose in strength.

The present invention presents a solution of the problem of increasing the strength of the disk in the above-mentioned cases against pressure or thrust. This is accomplished in accordance with the invention by so constructing the flexible intermediate webs which are connected with the ring bodies in the roughly, radial direction and extend substantially radially that they are displaced axially relatively to one another even in the unloaded condition of the disk, the webs connecting the ring bodies rigidly in the radial direction but being relatively flexible in the axial direction.

It is known to give pressure loaded disks a conical or parabolical, i. e. an inclined, form in order to increase their strength. The increase of strength against axial forces in this case rests on the fact that in consequence of the inclination of the plane of the disks alterations in diameter occur when the disks are deformed which arise owing to radial stresses and give rise to tangential stresses. The tangential stresses so arising prevent a further deformation and take up the stresses arising from the axial forces.

Similar conditions also occur with the inclination of the flexible intermediate webs according to the present invention. They are however only a comparatively unimportant auxiliary phenomenon and cannot give the disks any notable increase in resistance to thrust. In the most advantageous form of construction for carrying out the present invention, in which the inclination of the flexible intermediate webs is so directed that, under load at the meeting points of the ring bodies and the flexible intermediate webs, they seek to decrease the large diameters and to increase the small diameters, and in which preferably the flexible intermediate webs are arranged one-sidedly with respect to the ring bodies, even an increase in the maximum tangential force at the free ends of the ring bodies is caused hereby.

The advantageous effect of the arrangement according to the present invention rests on quite new considerations and effects determined by me which are conditioned by the special construction of the disks consisting of ring bodies and flexible intermediate webs and cannot therefore hold good for conical or parabolic disks of other construction, at least not in any amount of practical importance. As mentioned above, the axial forces are taken up by disks which are constructed of concentric ring bodies connected together by flexible intermediate webs by bending moments exerted on the ring bodies. The invention involves arranging the flexible intermediate webs in such a way that these bending moments are diminished. To this end it makes use of the fact that in consequence of the great extension of the ring bodies as compared with the small flexible intermediate webs, comparatively high radial stresses arise in the flexible intermediate webs in case of differential expansion of the ring bodies, high compared with the radial stresses arising from the same cause in disks of normal construction. (To avoid misunderstanding it should be expresssly mentioned that the high radially directed bending stresses which occur in thrust loaded disks of normal construction are of no importance for this consideration.) According to the invention, with the aid of these comparatively high radial stresses bending moments are exerted on the ring bodies by arranging that the points of attachment of the flexible intermediate webs to the ring bodies are displaced relatively to one another. In practice this displacement is most simply attained by arranging that the flexible intermediate webs connecting the ring bodies have in the unloaded condition a position inclined to the radial direction, that is, the direction normal to the shaft axis.

As already mentioned, the radial stresses occur when the ring bodies expand differentially. This occurs, for example, when disks of the kind under consideration rotate. The stresses arising in known rings under centrifugal force increase as is known with the square of the peripheral speed, i. e. for a given number of revolutions per minute with the square of the mean diameter. The expansions are proportional to the stresses and give rise, in correspondence with the difference in diameters, to the tendency of differential expansion in the several ring bodies. Such differences in expansion can however also be caused in stationary disks, e. g. by differences in temperature. Such temperature differences between the ring bodies occur for example when disks of the construction under consideration serve as carriers for radially impinged rows of blades of gas and steam turbines as in such bladings the working medium progressively cools within the blading by expansion and giving up of energy.

In particular I have found that in the case of rotating disks which are especially highly stressed by the occurrence of centrifugal force, the bending moments exerted on the ring bodies by the axial and centrifugal forces which occur experience a diminution when the meeting points of the flexible intermediate webs and ring bodies are displaced with decreasing diameter with regard to the radial plane in the direction of those ends of the ring bodies which suffer the greatest increase in diameter under the load. By such a displacement of the points of contact a diminution of the stresses is therefore attainable.

By the use of disks of the construction under consideration as carriers of radially impinged rows of blades it is found advantageous to arrange the flexible intermediate webs at one end of the ring bodies, so that the rear sides of the disks are as smooth as possible and possess as small a surface as possible. The harmful exchange of heat between the quantities of driving medium on the two sides of the disk is thereby considerably diminished. In order to attain this advantage in the disk construction according to the present invention, it is proposed in the further development of the invention to provide the rear wall of the disk with a smooth conical or parabolic limiting surface. If several disks carrying radially impinged groups of blades are axially juxtaposed in known manner the further advantage arises in carrying back the working medium issuing from the one blade group towards the centre to enable it to enter the innermost row of blades of the next blade group that a constant or slowly decreasing cross section for the flow can be provided between the conical shaped rear sides of the disks, so that undesired changes in speed and eddy formation can be avoided.

In order that such a construction of the disks as blade carriers may provide an advantageous blade channel extending exactly radially in an outward direction, it is desirable that the axial length of the ring bodies should increase with increasing diameter. The greater length of the ring body simultaneously diminishes hereby in an advantageous manner the stresses which tend to increase with greater peripheral speed.

The accompanying drawings show by way of example several constructions of disks according to the invention. In said drawings, Figure 1 shows a vertical section through two axially juxtaposed groups of radially impinged steam turbine blades which are carried by disks constructed according to the present invention.

Figure 1:
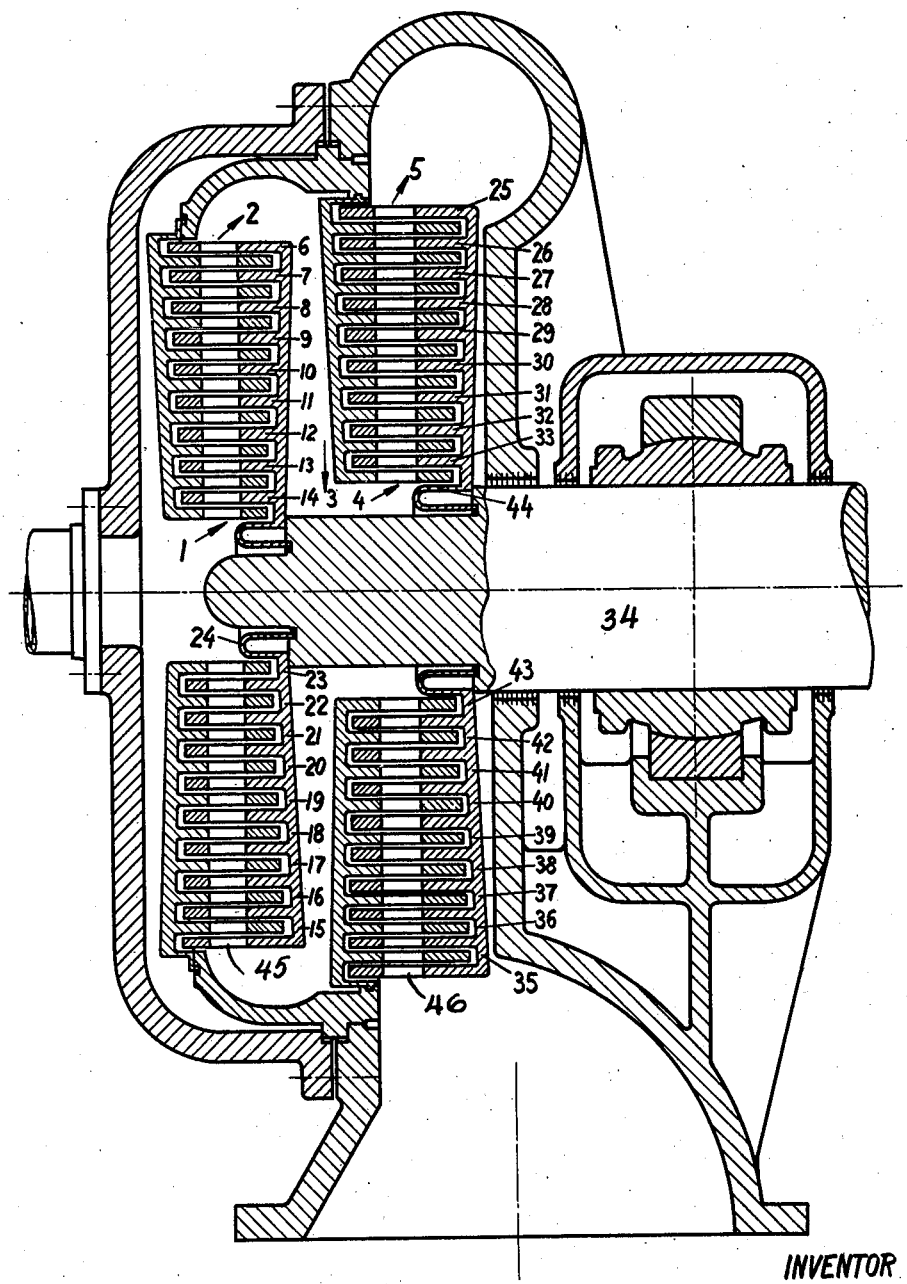

In Figure 1 the steam enters at 1 into the first blade group, traverses it from the inside in an outward direction and leaves it at 2. It then flows through the section 3 from the outside towards the inside in order to enter at 4 into the second blade group which is likewise traversed from the inside in an outward direction and the steam leaves it at 5. The first rotary disk consists for example of the ring bodies 6—14 and the flexible intermediate webs 15—23 which connect the ring bodies together in an elastic manner. The cross section of the annular ring bodies 6—14 extends continuously without interruption of the material along their whole circumference and is of greater axial length than and the same radial thickness as the axial dimension of the flexible intermediate webs 15—23. At the inner periphery the disk is supported by the thin elastic ring 24 against the portion 34 of the shaft. The last rotary disk consists in a similar manner of the ring bodies 25—33 which are connected together by the flexible intermediate webs 35—43. At the inner periphery the disk is supported by means of the thin elastic ring 44 against the part 34 of the shaft. These rotary disks are loaded for example by an axial thrust towards the right as the pressure on the smooth rear sides of the disks is lower than on the bladed front sides. A torque is thus exerted on the ring bodies in a clockwise direction (viewed at the upper part of Fig. 1) which for example expands the end of the ring body 26 which carries the blade 46. The centrifugal force exerted by the blade 46 on the ring body 26 acts in the same direction. The same holds good for example for the ring body 6 loaded by the blade 45.

As follows from the arrangement shown on a larger scale in Figure 2 the ring body 25 adjacent the ring body 26 will expand owing to the increased effect of centrifugal force due to its greater diameter to a larger extent than the ring body 26, the ring body 27, on the other hand, will expand less in consequence of the smaller effect of centrifugal force due to its smaller diameter, so that a tension force in an outward direction is caused in the flexible intermediate web 35 and an inwardly directed tension force is caused in the flexible intermediate web 36. If now, as is shown in the drawings, the point of attachment of the flexible intermediate web 35 to the ring body 26 is more distant from the most strongly expanded end of the ring body 26 than the point of attachment of the flexible intermediate web 36, a bending moment in a counter-clockwise direction is produced which diminishes the prevailing stresses. The displacement of the points of attachment of the flexible intermediate webs 35 and 36 to the ring body 26 is attained in the drawings owing to the fact that the flexible intermediate webs are inclined to the radial plane. As the radially directed forces produced by the ring bodies and the flexible intermediate webs act strictly in a purely radial direction, the axial position of the middle portion of the mean diameter of the flexible intermediate webs is the determining factor for the production of the above described auxiliary moment and not the axial position at the point of contact itself, whereby the effect due to the increase in the effective lever arm of the bending moment produced by the radial forces is substantially increased. The effect is the same as if each flexible intermediate web, while maintaining its mean position, was disposed perpendicularly, as shown in Figure 3, in which the same references are used.

Figure 2:
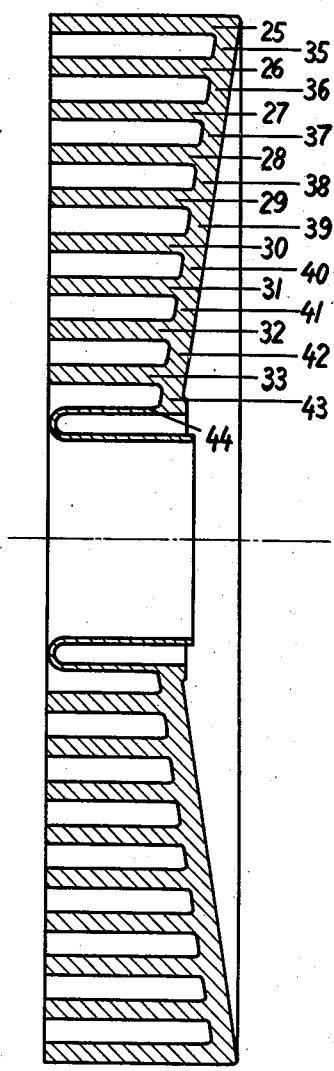
Figure 2 shows on a larger scale one of the disks according to the invention shown in Figure 1, whereby the axial displacement of the point of connection of the ring bodies and flexible intermediate webs is obtained by the aslant position of the webs.
Figure 3:
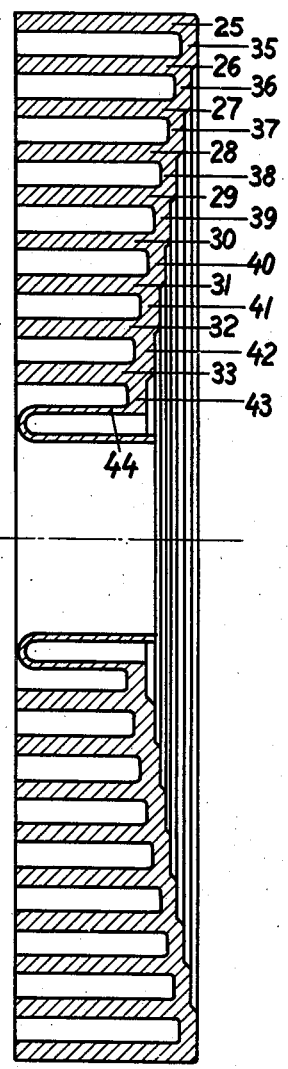
Figure 3 shows a disk of similar type to that in Figure 2 with the difference that the flexible intermediate webs run in an exactly radial direction but are displaced stepwise axially.

In a particularly advantageous construction Figures 1 and 2 show disks in which the flexible intermediate webs 15—23 and 35—43 are disposed at one end of the ring bodies 6—14 and 25—33 whereby the rear wall of the disks possesses a smooth conical bounding surface and so offers as small a surface as possible to heat exchange. With this construction there is minimum wall friction at the smooth rear surface both in relation to the tangentially directed relative movement through the revolving movement of the disks and also in relation to the radially inwardly directed flow of the driving medium itself. Moreover Figure 1 makes clear that by the shorter construction of the inwardly disposed ring body a purely radial bow of the driving medium in the middle can be obtained. The highly stressed outermost ring bodies maintain in this construction their full length and the aslant position of the rears of the disks is attained at the cost of the ring body of smaller diameter which is only slightly stressed by centrifugal force. The constructions shown are presented by way of example and the invention is in no way limited to them.

The advantageous cross sectional form of the channel 3 in Figure 1 should also be mentioned, which in consequence of the opposed inclinations of the rear sides of the disks possesses a substantially constant cross section in the radial direction in spite of the large variations in diameter, so that undesirable changes in the speed of the driving medium are prevented.

The figures show disks constructed according to my copending application Serial No. 600,500. The annular elements of such disks are less extended in the radial direction than in the axial direction whereby said elements withstand the action of axially directed forces chiefly by means of tangential stresses. As such disks are already capable of resisting considerable axial thrusts, very strong disks are obtained if the arrangement according to the present invention is applied to them. In this way an especially advantageous construction is obtained. The constructional features of the present invention are, however, not limited in use to the construction of said copending application.

I desire to call attention also to my copending application Ser. No. 25,676 which describes and claims a construction wherein the elastic connecting member between the disk and shaft is relieved of axial thrust or torque. My copending application Ser. No. 600,500, on the other hand, as already indicated, describes and claims a disk composed of rings of larger axial length than radial thickness, the connecting members between the rings all lying in the same radial plane normal to the axis of the shaft. The present application, as will be clear from the above, relates to a construction in which the connecting members or webs between the rings composing the disk do not lie in a normal radial plane but rather along an inclined surface, such as the surface of a cone or of a paraboloid of revolution.

I claim:

1. A disk suitable for use in radial flow machines comprising a plurality of annular ring bodies arranged concentrically to each other, and axially flexible, intermediate webs connecting said annular ring bodies with each other rigidly in radial direction and extending in a substantially radial direction, the cross-section of said annular ring bodies which extends continuously without interruption of the material along their whole circumference being of greater axial length than, and of substantially the same radial thickness as, the axial dimension of said intermediate webs, and said intermediate webs being displaced relatively to each other in an axial direction even in the unloaded condition.

2. A disk suitable for use in a radial flow machine comprising a plurality of annular ring bodies arranged concentrically to each other, and axially flexible, intermediate webs connecting said annular ring bodies with each other rigidly in generally radial direction and extending in a substantially radial direction, the cross-section of said annular ring bodies which extends continuously without interruption of the material along their whole circumference being of greater axial length than, and of substantially the same radial thickness as, the axial dimension of said intermediate webs, and said intermediate webs being inclined to the radial direction even in the unloaded condition.

3. A disk suitable for use in a radial flow machine comprising a plurality of annular ring bodies arranged concentrically to each other, and axially flexible, intermediate webs connecting said annular ring bodies with each other rigidly in generally radial direction and extending in a substantially radial direction, the cross-section of said annular ring bodies which extends continuously without interruption of the material along their whole circumference being of greater axial length than, and of substantially the same radial thickness as, the axial dimension of said intermediate webs, and the meeting points of said annular ring bodies and said intermediate webs being displaced with decreasing diameter relatively to the radial plane in the direction of those ends of said annular ring bodies which experience the greatest increase in diameter under load.

4. A disk suitable for use in a radial flow machine comprising a plurality of annular ring bodies arranged concentrically to each other, and axially flexible, intermediate webs connecting one end of said annular ring bodies with each other rigidly in generally radial direction, and extending in a direction slightly inclined to the radial direction, the cross section of said annular ring bodies which extends continuously without interruption of the material along their whole circumference being of greater axial length than, and of substantially the same radial thickness as, the axial dimension of said intermediate webs, and the rear wall of said disc formed by said annular ring bodies and said flexible intermediate webs possessing a smooth conical or parabolical surface.

5. A disk according to claim 1, wherein the axial length of said annular ring bodies increases with increase in diameter.

6. A disk according to claim 2, wherein the axial length of said annular ring bodies increases with increase in diameter.

7. A disk according to claim 3, wherein the axial length of said annular ring bodies increases with increase in diameter.

8. A disk according to claim 4, wherein the axial length of said annular ring bodies increases with increase in diameter.

9. In combination, a disk suitable for use in a radial-flow-machine comprising a plurality of annular ring bodies arranged concentrically to each other, and axially flexible, intermediate webs connecting said annular ring bodies with each other rigidly in generally radial direction and extending in a substantially radial direction, a machine part supporting said disk, and a joint capable of deformation connecting said disk to said machine part and allowing for radial movement of said disk relative to said machine part, the cross section of said annular ring bodies which extends continuously without interruption of the material along their whole circumference being of greater axial length than the axial dimension of said flexible intermediate webs and said flexible intermediate webs being displaced relatively to each other in an axial direction even in the unloaded condition.

10. In combination, a disk suitable for use in a radial-flow-machine comprising a plurality of annular ring bodies arranged concentrically to each other, and axially flexible, intermediate webs connecting said annular ring bodies with each other rigidly in generally radial direction and extending in a substantially radial direction, a machine part supporting said disk, and a joint capable of deformation connecting said disk to said machine part and allowing for radial movement of said disk relative to said machine part, the cross section of said annular ring bodies which extends continuously without interruption of the material along their whole circumference being of greater axial length than the axial dimension of said flexible intermediate webs and said flexible intermediate webs being inclined to the radial direction even in the unloaded condition.

11. In combination, a disk suitable for use in a radial-flow-machine comprising a plurality of annular ring bodies arranged concentrically to each other, and axially flexible, intermediate webs connecting said annular ring bodies with each other rigidly in generally radial direction and extending in a substantially radial direction, a machine part supporting said disk, and a joint capable of deformation connecting said disk to said machine part and allowing for radial movement of said disk relative to said machine part, the cross section of said annular ring bodies which extends continuously without interruption of the material along their whole circumference being of greater axial length than the axial dimension of said flexible intermediate webs, and the meeting points of said annular ring bodies and said flexible intermediate webs being displaced with decreasing diameter relatively to the radial plane in the direction of those ends of said annular ring bodies which experience the greatest increase in diameter under load.

12. In combination, a disk suitable for use in a radial-flow-machine comprising a plurality of annular ring bodies arranged concentrically to each other, and axially flexible, intermediate webs connecting one end of said annular ring bodies with each other rigidly in generally radial direction and extending in a direction slightly inclined to the radial direction, a machine part supporting said disk, and a joint capable of deformation connecting said disk to said machine part and allowing for radial movement of said disk relative to said machine part, the cross section of said annular ring bodies which extends continuously without interruption of the material along their whole circumference being of greater axial length than the axial dimension of said flexible intermediate webs, and the rear wall of said disk formed by said annular ring bodies and said flexible intermediate webs possessing a smooth conical or parabolical surface.

13. The combination according to claim 9, wherein the axial length of said annular ring bodies increases with increase in diameter.

14. The combination according to claim 10, wherein the axial length of said annular ring bodies increases with increase in diameter.

15. The combination according to claim 11, wherein the axial length of said annular ring bodies increases with increase in diameter.

16. The combination according to claim 12, wherein the axial length of said annular ring bodies increases with increase in diameter.

ULRICH MEININGHAUS.